(12) United States Patent
Seeley

(10) Patent No.: US 12,540,731 B2
(45) Date of Patent: Feb. 3, 2026

(54) ABATEMENT APPARATUS

(71) Applicant: Edwards Limited, Burgess Hill (GB)

(72) Inventor: Andrew James Seeley, Clevedon (GB)

(73) Assignee: Edwards Limited

( * ) Notice: Subject to any disclaimer, the term of this patent is extended or adjusted under 35 U.S.C. 154(b) by 341 days.

(21) Appl. No.: 18/549,671

(22) PCT Filed: Mar. 2, 2022

(86) PCT No.: PCT/GB2022/050545
§ 371 (c)(1),
(2) Date: Sep. 8, 2023

(87) PCT Pub. No.: WO2022/189767
PCT Pub. Date: Sep. 15, 2022

(65) Prior Publication Data
US 2024/0159395 A1    May 16, 2024

(30) Foreign Application Priority Data

Mar. 12, 2021 (GB) .................................... 2103480

(51) Int. Cl.
 *F23J 15/06* (2006.01)
 *B01D 47/06* (2006.01)
 *F23G 7/06* (2006.01)

(52) U.S. Cl.
 CPC .............. *F23J 15/06* (2013.01); *B01D 47/06* (2013.01); *F23G 7/06* (2013.01)

(58) Field of Classification Search
 CPC ........ B01D 47/06; F23G 7/06; F23J 2217/50; F23J 2219/80; F23J 15/022; F23J 15/04
 (Continued)

(56) References Cited

U.S. PATENT DOCUMENTS 8,293,184 B2 * 10/2012 Moore ................ H01L 21/6708
                                                            422/186.04
2010/0116140 A1 * 5/2010 Arai .................... B01D 53/8662
                                                                  96/252

(Continued)

FOREIGN PATENT DOCUMENTS

CN    110743327 A    2/2020
CN    210219838 U    3/2020

(Continued)

OTHER PUBLICATIONS

Japanese Notification of Reason for Rejection dated Nov. 14, 2024 for corresponding Japanese application Serial No. 2023-555253, 6 pages.

(Continued)

*Primary Examiner* — Steve S Tanenbaum
(74) *Attorney, Agent, or Firm* — Theodore M. Magee; Westman, Champlin & Koehler, P.A.

(57) ABSTRACT

A method of cooling an abatement apparatus for abatement of an effluent stream from a semiconductor processing tool includes: providing at least one modular cooling assembly having a cooling capacity; determining a cooling requirement of an abatement apparatus; and incorporating into the abatement apparatus a number of the modular cooling assemblies whose cumulative cooling capacity at least matches the cooling requirement of the abatement apparatus. In this way, multiple modular cooling assemblies may be incorporated into the abatement apparatus, each of which provides cooling capacity. The number of modular cooling assemblies can be selected to suit the cooling requirement of the abatement apparatus.

24 Claims, 2 Drawing Sheets

(58) Field of Classification Search
USPC .......................................................... 165/108
See application file for complete search history.

(56) References Cited

U.S. PATENT DOCUMENTS

| | | | | |
|---|---|---|---|---|
| 2015/0000870 | A1* | 1/2015 | Hosotani | F02C 7/08 |
| | | | | 165/104.19 |
| 2017/0144092 | A1* | 5/2017 | Seeley | B04B 5/10 |
| 2020/0038796 | A1* | 2/2020 | Fekety | C03B 19/106 |
| 2021/0057236 | A1* | 2/2021 | Sekine | B01D 47/022 |

FOREIGN PATENT DOCUMENTS

| | | |
|---|---|---|
| EP | 0694735 A1 | 1/1996 |
| EP | 2168655 A1 | 3/2010 |
| EP | 3219380 A1 | 9/2017 |
| JP | 2001068886 A | 3/2001 |
| WO | 9934899 A1 | 7/1999 |
| WO | 2019092409 A1 | 5/2019 |

OTHER PUBLICATIONS

British Search Report dated Aug. 18, 2021 for corresponding British Application No. GB2103480.6, 1 pages.

PCT Notification of Transmittal of the International Search Report and the Written Opinion of the International Searching Authority, or the Declaration and PCT Search Report dated Jun. 27, 2022 for corresponding PCT application Serial No. PCT/GB2022/050545, 15 pages.

Japanese Notification of Reason for Rejection dated Aug. 12, 2025 for corresponding Japanese application Serial No. 2023-555253, 11 pages.

Taiwanese Search Report dated Jul. 30, 2025 for corresponding Taiwanese application Serial No. 111108290, 21 pages.

* cited by examiner

ABATEMENT APPARATUS

CROSS-REFERENCE OF RELATED APPLICATION

This application is a Section 371 National Stage Application of International Application No. PCT/GB2022/050545, filed Mar. 2, 2022, and published as WO 2022/189767A1 on Sep. 15, 2022, the content of which is hereby incorporated by reference in its entirety and which claims priority of British Application No. 2103480.6, filed Mar. 12, 2021.

FIELD

The field of the invention relates to an abatement apparatus and a method.

BACKGROUND

Abatement apparatus, such as radiant burners, are known and are typically used for treating an effluent gas stream from a manufacturing processing tool used in, for example, the semiconductor or flat panel display manufacturing industry. During such manufacturing, residual perfluorinated compounds (PFCs) and other compounds exist in the effluent gas stream pumped from the process tool. PFCs are difficult to remove from the effluent gas and their release into the environment is undesirable because they are known to have relatively high greenhouse activity.

Known radiant burners use combustion to remove the PFCs and other compounds from the effluent gas stream, such as that described in EP 0 694 735. Typically, the effluent gas stream is a nitrogen stream containing PFCs and other compounds. The effluent stream is conveyed into a combustion chamber that is laterally surrounded by the exit surface of a foraminous gas burner. In some cases treatment materials, such as fuel gas, can be mixed with the effluent gas stream before entering the combustion chamber. Fuel gas and air are simultaneously supplied to the foraminous burner to affect combustion at the exit surface. The products of combustion from the foraminous burner react with the effluent stream mixture to combust compounds in the effluent stream.

Although abatement apparatus exist, they each have their own shortcomings. Accordingly, it is desired to provide an improved abatement apparatus.

The discussion above is merely provided for general background information and is not intended to be used as an aid in determining the scope of the claimed subject matter. The claimed subject matter is not limited to implementations that solve any or all disadvantages noted in the background.

SUMMARY

According to a first aspect, there is provided a method of cooling an abatement apparatus for abatement of an effluent stream from a semiconductor processing tool, the method comprising: providing at least one modular cooling assembly having a cooling capacity; determining a cooling requirement of an abatement apparatus; and incorporating into the abatement apparatus a number of the modular cooling assemblies whose cumulative cooling capacity at least matches the cooling requirement of the abatement apparatus.

The first aspect recognizes that a problem with existing abatement apparatus configurations is that the cooling components for those abatement apparatus are typically designed to suit the conditions expected within the abatement apparatus. That cooling design is then validated through testing. Should the configuration of the abatement apparatus need to change, then a new cooling design is typically required, which also then needs to be validated. Each cooling design is therefore essentially unique, requires different parts and the underlying architecture of existing arrangements has scalability limits.

Accordingly, a method of cooling an abatement apparatus is provided. The abatement apparatus may be for abatement of an effluent stream. The effluent stream may be from a semiconductor processing tool. The method may comprise providing at least one modular cooling assembly. The modular cooling assembly may have a cooling capacity or capability. The method may comprise determining a cooling requirement of the abatement apparatus. The method may comprise incorporating into the abatement apparatus a number of the modular cooling assemblies. The number of the modular cooling assemblies may be that number whose cumulative or collective cooling capacity at least matches or achieves the cooling requirement of the abatement apparatus. In this way, multiple modular cooling assemblies may be incorporated into the abatement apparatus, each of which provides cooling capacity. The number of modular cooling assemblies can be selected to suit the cooling requirement of the abatement apparatus. This provides an architecture which is readily scalable to suit the varying cooling needs of different abatement apparatus whilst retaining a common cooling assembly which has been validated and which helps to reduce the inventory count of different parts required.

The incorporating may comprise incorporating the number of the modular cooling assemblies whose cumulative cooling capacity exceeds the cooling requirement of the abatement apparatus. Hence, typically more cooling capacity than that which is required may be incorporated into the abatement apparatus.

The incorporating may comprise incorporating a plurality of the modular cooling assemblies.

The providing may comprise providing each modular cooling assembly with at least one pump to recirculate coolant within the abatement apparatus to cool the abatement apparatus.

The providing may comprise providing each modular cooling assembly with a first pump configured to convey the coolant from a drain tank downstream of an abatement chamber within a first tower of the abatement apparatus to cool the abatement apparatus.

The providing may comprise providing each modular cooling assembly with a separator to separate particulates within the coolant to provide a particulate stream and a coolant stream to cool the abatement apparatus.

The providing may comprise configuring the separator to convey the particulate stream to the drain tank.

The providing may comprise providing each modular cooling assembly with a heat exchanger to cool incoming coolant and provide outgoing coolant to cool the abatement apparatus.

The providing may comprise configuring the first pump, the separator and the heat exchanger in series to provide the outgoing coolant to cool the abatement apparatus.

The providing may comprise providing each modular cooling assembly with a second pump located downstream of the first pump, the separator and the heat exchanger to provide the outgoing coolant to cool the abatement apparatus.

The providing may comprise providing each modular cooling assembly with a quench sprayer located downstream of the abatement chamber and conveying the outgoing coolant to the quench sprayer to cool the first tower of the abatement apparatus.

The providing may comprise providing each modular cooling assembly with a sieve feed conduit located upstream of a sieve within a second tower of the abatement apparatus and conveying the outgoing coolant to the sieve feed conduit to cool the second tower of the abatement apparatus.

The providing may comprise conveying the outgoing coolant in a greater quantity to the quench sprayer than to the sieve feed conduit.

The providing may comprise providing each modular cooling assembly with a further pump assembly configured to receive the coolant from a sump tank within the second tower of the abatement apparatus to cool the abatement apparatus.

The providing may comprise configuring the further pump assembly to convey the coolant to a first weir of the first tower to cool the abatement apparatus.

The providing may comprise configuring the further pump assembly to convey the coolant to a second weir of the second tower to cool the abatement apparatus.

The providing may comprise conveying the coolant in a greater quantity to the second weir than to the first weir.

The further pump assembly may comprise third and fourth pumps arranged in parallel.

Each pump of the modular cooling assembly may be identical, matching, the same and/or mirrored.

The method may comprise providing the sieve with an overflow configured to convey excess head of coolant from the sieve to the sump tank.

The method may comprise providing the abatement apparatus with an effluent stream conduit fluidly coupling an above-coolant region of the drain tank with an above-coolant region of the sump tank.

The method may comprise providing the abatement apparatus with a coolant balance conduit fluidly coupling a coolant region of the drain tank with a coolant region of the sump tank.

The providing may comprise conveying the coolant in a greater quantity to the second tower than the first tower to provide a net flow of coolant through the coolant balance conduit from the second tower to the first tower.

According to a second aspect, there is provided an abatement apparatus for abatement of an effluent stream from a semiconductor processing tool, the abatement apparatus having a cooling requirement and comprising: a number of modular cooling assemblies whose cumulative cooling capacity at least matches the cooling requirement of the abatement apparatus.

The number of the modular cooling assemblies may have a cumulative cooling capacity that exceeds the cooling requirement of the abatement apparatus.

The number of modular cooling assemblies may comprise a plurality of the modular cooling assemblies.

Each modular cooling assembly may comprise a first pump configured to convey the coolant from a drain tank downstream of an abatement chamber of within a first tower of the abatement apparatus to cool the abatement apparatus.

Each modular cooling assembly may comprise a separator to separate particulates within the coolant to provide a particulate stream and a coolant stream to cool the abatement apparatus.

The separator may be configured to convey the particulate stream to the drain tank.

Each modular cooling assembly may comprise a heat exchanger to cool incoming coolant and provide outgoing coolant to cool the abatement apparatus.

The first pump, the separator and the heat exchanger may be configured in series to provide the outgoing coolant to cool the abatement apparatus.

Each modular cooling assembly may comprise a second pump located downstream of the first pump, the separator and the heat exchanger to provide the outgoing coolant to cool the abatement apparatus.

Each modular cooling assembly may comprise a quench sprayer located downstream of the abatement chamber configured to convey the outgoing coolant to cool the first tower of the abatement apparatus.

Each modular cooling assembly may comprise a sieve feed conduit located upstream of a sieve within a second tower of the abatement apparatus configured to convey the outgoing coolant to cool the second tower of the abatement apparatus.

Each modular cooling assembly may be configured to convey the outgoing coolant in a greater quantity to the quench sprayer than to the sieve feed conduit.

Each modular cooling assembly may comprise a further pump assembly configured to receive the coolant from a sump tank within the second tower of the abatement apparatus to cool the abatement apparatus.

The further pump assembly may be configured to convey the coolant to a first weir of the first tower to cool the abatement apparatus.

The further pump assembly may be configured to convey the coolant to a second weir of the second tower to cool the abatement apparatus.

Each modular cooling assembly may be configured to convey the coolant in a greater quantity to the second weir than to the first weir.

The further pump assembly may comprise third and fourth pumps arranged in parallel.

Each pump of the modular cooling assembly may be is identical, matching, the same and/or mirrored.

The apparatus may comprise an overflow configured to convey excess head of coolant from the sieve to the sump tank.

The apparatus may comprise an effluent stream conduit fluidly coupling an above-coolant region of the drain with an above-coolant region of the sump tank.

The apparatus may comprise a coolant balance conduit fluidly coupling a coolant region of the drain with a coolant region of the sump tank.

Each modular cooling assembly may be configured to convey the coolant in a greater quantity to the second tower than the first tower to provide a net flow of coolant through the coolant balance conduit from the second tower to the first tower.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

The Summary is provided to introduce a selection of concepts in a simplified form that are further described in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention will now be described further, with reference to the accompanying drawings, in which.

DETAILED DESCRIPTION

Before discussing the embodiments in any more detail, first an overview will be provided. Some embodiments provide a modular cooling assembly which provides for a predetermined amount of cooling for an abatement apparatus using common components. For any particular size of abatement apparatus and any particular cooling requirement, the required number of modular cooling assemblies can be determined to deliver the appropriate cooling using the same common components, rather than needing to provide a bespoke cooling assembly for each different abatement apparatus. This provides for scalability of cooling as well as helping to reduce the inventory count of the components required to provide for differing cooling requirements and simplifies maintenance.

In some embodiments, the modular cooling assembly contains one or more pumps which recirculate coolant to provide that coolant to different parts of the abatement apparatus. Typically, one or more heat exchangers is provided which cools the coolant provided from the abatement apparatus prior to recirculating the cooled coolant to different locations within the abatement apparatus. Typically, one or more separators is provided which helps to reduce the amount of particulates within the coolant prior to recirculating the coolant into the abatement apparatus. Although the modular cooling assembly may have more than one pump and/or heat exchanger and/or separators, typically each of those pumps and/or heat exchangers and/or separators is identical in order to reduce inventory.

Abatement Apparatus

Figure 1:
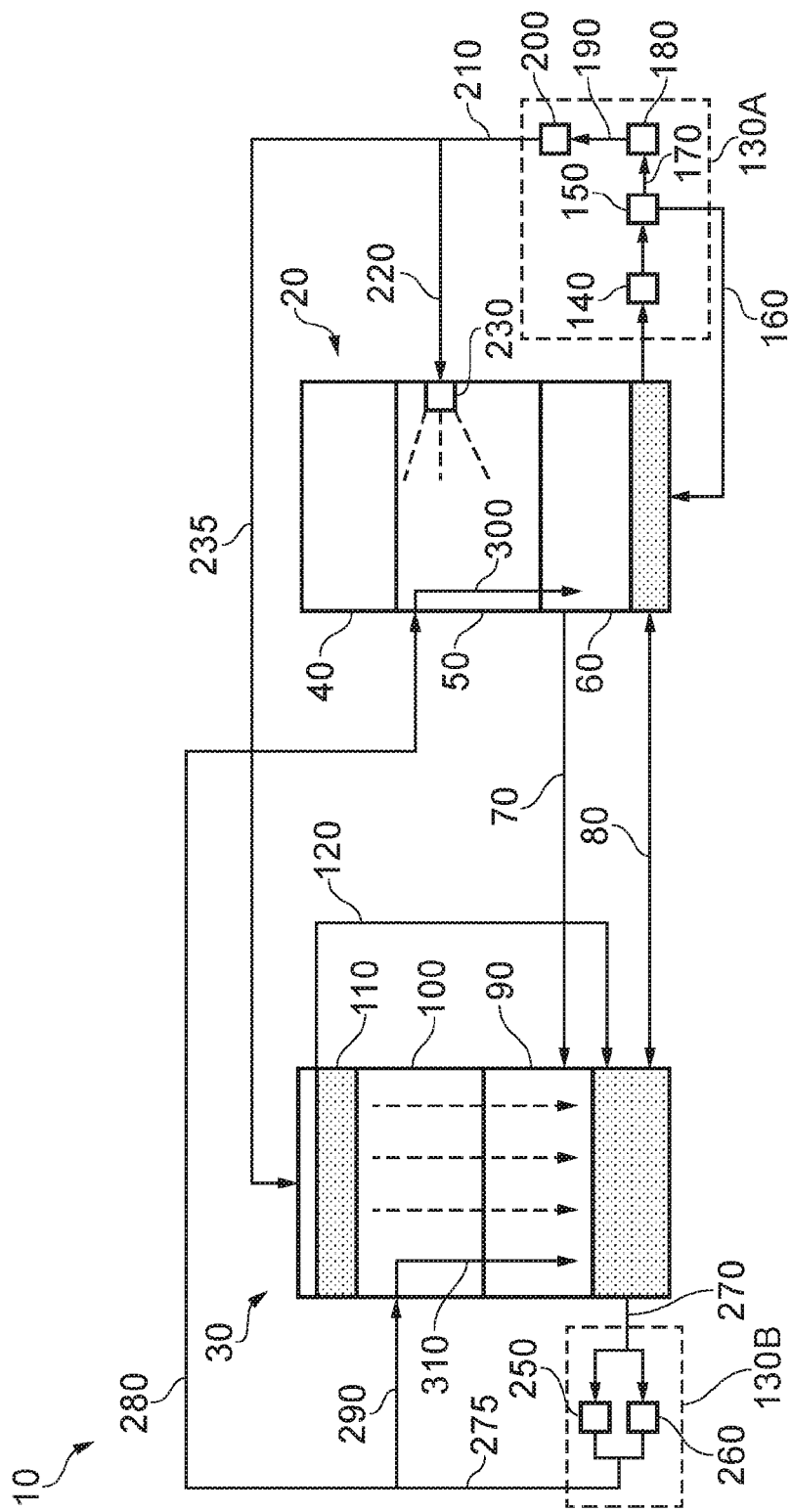
FIG. 1 illustrates schematically the main components of an abatement apparatus according to one embodiment.

FIG. 1 illustrates schematically the main components of an abatement apparatus 10 according to one embodiment. The abatement apparatus 10 comprises a first tower 20 and a second tower 30. Although this embodiment describes the use of two towers 20, 30, it will be appreciated that a single tower or more towers could be provided.

The first tower 20 has an abatement chamber 40 which receives an effluent stream to be abated from a semiconductor processing tool, together with other abatement reagents and provides an abated effluent stream. Downstream of the abatement chamber 40 is a quench chamber 50 which receives the abated effluent stream and any combustion by-products from the abatement chamber 40 and produces a cooled treated effluent stream. Downstream of the quench chamber 50 is a drain chamber 60 which receives the cooled treated effluent stream as well as a coolant, as will be explained in more detail below. The drain chamber 60 couples with a gas conduit 70 which is located above a coolant level of the drain chamber 60 and with a coolant balance conduit 80 which is located below the coolant level within the drain chamber 60.

The gas conduit 70 couples with a sump chamber 90 located in the base of the second tower 30 above the coolant level. The coolant balance conduit 80 couples with the sump chamber 90 below the coolant level. The gas conduit 70 conveys the cooled treated effluent stream from the drain chamber 60 to the sump chamber 90. The coolant balance conduit 80 allows the coolant levels in the drain chamber 60 and the sump chamber 90 to equalize, preventing an imbalance in coolant levels between the first tower 20 and the second tower 30. As will be explained in more detail below, typically the abatement apparatus 10 is configured to convey excess coolant to the sump chamber 90 to cause a net flow of coolant from the sump chamber 90 to the drain chamber 60 via the coolant balance conduit 80, as will be explained in more detail below.

Upstream of the sump chamber 90 is a combined wet electrostatic precipitator and packed tower 100. The packed tower 100 comprises a sieve 110 which serves to irrigate the packed tower 100. Further upstream components of the second tower 30 may be provided, but these are omitted to improve clarity.

The sieve 110 is provided with apertures in its base through which coolant exits under gravity through the packed tower 100 and into the sump chamber 90. The size and quantity of apertures, together with the height of the coolant within the sieve 100, limits the flow rate of the coolant into the packed tower 100. In addition, the sieve 110 has an overflow 120 having an inlet positioned at a selected height above the perforated base of the sieve 110. The overflow 120 provides a direct path for excess coolant from the sieve 110 to the sump chamber 90.

Modular Cooling Assembly

The abatement apparatus 10 also comprises a modular cooling assembly 130A, 130B. Although components of the modular cooling assembly 130A, 130B are illustrated schematically as being separated, it will be appreciated that this need not be the case and that they may be co-located. The modular cooling assembly 130A comprises a first pump 140 which is coupled with the drain chamber 60 below the coolant level. The first pump 140 feeds a separator, in this example a hydrocyclone 150. The hydrocyclone 150 couples via a slurry conduit 160 to the drain chamber 60. The hydrocyclone also couples with a coolant conduit 170 to a heat exchanger 180. The heat exchanger 180 couples via a coolant conduit 190 with a second pump 200. The second pump 200 pumps the coolant via a coolant conduit 210 which splits into a quench conduit 220, which couples with a quench spray assembly 230, and via a sieve feed conduit 235 which feeds the sieve 110. Although a single quench spray assembly 230 is shown, it will be appreciated that multiple quench spray assemblies 230 may be provided typically arranged circumferentially around the quench chamber 50 and fed by the quench conduit 220. The quench conduit 220 is configured to deliver a greater amount of coolant to the quench spray assembly 230 than the sieve feed conduit 240 provides to the sieve 110.

The modular cooling assembly 130B comprises a third pump 250 and a fourth pump 260. The third pump 250 and the fourth pump 260 are arranged in parallel. Both the third pump 250 and the fourth pump 260 are coupled with the sump chamber 90 and receive coolant via a feed conduit 270. The third pump 250 and the fourth pump 260 both feed a coolant outlet conduit 275 which is coupled with a first packed tower weir feed conduit 280 and a second packed tower weir feed conduit 290. The first packed tower weir feed conduit 280 conveys coolant to a first weir 300 within the quench chamber 50 which typically provides a curtain of coolant around the circumference of the quench chamber 50. The second packed tower weir feed conduit 290 feeds a second weir 310 in the combined wet electrostatic precipitator and packed tower 100 which typically provides a curtain of coolant around the circumference of the combined wet electrostatic precipitator and packed tower 100. The second packed tower weir feed conduit 290 is configured to convey a greater amount of coolant than the first packed tower weir feed conduit 280.

In operation, an effluent stream is provided together with any combustion reagents to the abatement chamber 40 and undergoes abatement. A heated abated effluent stream exits the abatement chamber 40 and enters the quench chamber 50 where it is cooled by the quench spray assembly 230. The quench chamber 50 is cooled by the first weir 300. The effluent stream passes into the drain chamber 60, as does coolant from the quench spray assembly 230 and the first weir 300. The cooled effluent stream passes through the gas conduit 70 to the sump chamber 90. The effluent stream then passes up through the combined wet electrostatic precipitator and packed tower 100. Further particulates within the cooled effluent stream are removed by the wet electrostatic precipitator and dissolvable compounds are removed from the cooled effluent stream by the packed tower. The effluent stream then passes to further downstream components (not shown) before being vented to atmosphere.

Meanwhile, the modular cooling assembly 130A, 130B recirculates coolant to facilitate cooling of the abatement apparatus 10. In particular, coolant typically laden with particulate matter is conveyed by the first pump 140 to the hydrocyclone 150. The hydrocyclone 150 separates particulates from the coolant and provides this as a slurry via the slurry conduit 160 back to the drain chamber 60. The hydrocyclone 150 also provides a particulate-depleted (cleaned) coolant to the heat exchanger 180. The heat exchanger 180 reduces the temperature of the received coolant and provides cooled coolant to the second pump 200. The second pump 200 pumps the cooled coolant to the quench spray assembly 230 which sprays the cooled coolant into the quench chamber 50 to cool the heated effluent stream. The second pump 200 also conveys the cooled coolant to the sieve 110. The cooled coolant is received by the sieve 110 and flows through the perforated base in the sieve 110 and through the combined wet electrostatic precipitator and packed tower 100 and on to the sump chamber 90. Any excess cooled coolant within the sieve 100 flows through the overflow 120 and into the sump chamber 90. The presence of the overflow 120 helps to prevent an over-irrigation or flooding of coolant into the packed tower 100 causing an unacceptable back pressure against the flow of the effluent stream through the abatement apparatus 10.

The third pump 250 and the fourth pump 260 of the modular cooling assembly 130B together convey coolant from the sump chamber 90. The third pump 250 and the fourth pump 260 together provide coolant to the first weir 300 and the second weir 310.

Typically, the first pump 140 will pump coolant at around 66 litres per minute at 1 bar to the hydrocyclone 150 which provides slurry at 6 litres per minute and coolant to the heat exchanger 180 at 60 litres per minute. The heat exchanger 180 provides a 25° C. temperature difference, giving around 100 kW of cooling. The cooled coolant is typically supplied by the second pump 200 to the quench spray assembly 230 at a rate of around 40 litres per minute at 1 bar and at around 20 litres per minute to the sieve 110. The presence of the first pump 140 and the second pump 200 helps to accommodate the pressure drop across the hydrocyclone 150 and the heat exchanger 180. The parallel arrangement of the third pump 250 and the fourth pump 260 provides a flow rate of around 120 litres per minute at 1 bar. The coolant supplied to the first weir 300 is typically at a flow rate of around 20 litres per minute and the coolant supplied to the second weir 310 is typically at around 100 litres per minute.

In some embodiments, the abatement chamber 40 receives a silicon-containing gas such as silane, which produces silicon dioxide and/or a fluorine-containing gas such as nitrogen trifluoride, which produces hydrogen fluoride. The hydrogen fluoride is scrubbed out by the coolant in the combined wet electrostatic precipitator and packed tower 100 and this generates an aqueous solution of hydrogen fluoride in the sump chamber 90. The recirculation of the coolant enables the aqueous solution of hydrogen fluoride to be mixed with suspended silica in the slurry in the drain chamber 60 and this reacts to form hexafluorosilicic acid which has a lower vapour pressure above the solution which means that the combined wet electrostatic precipitator and packed tower 100 can scrub to lower levels of hydrogen fluoride.

Differing Cooling Requirements

Figure 2:
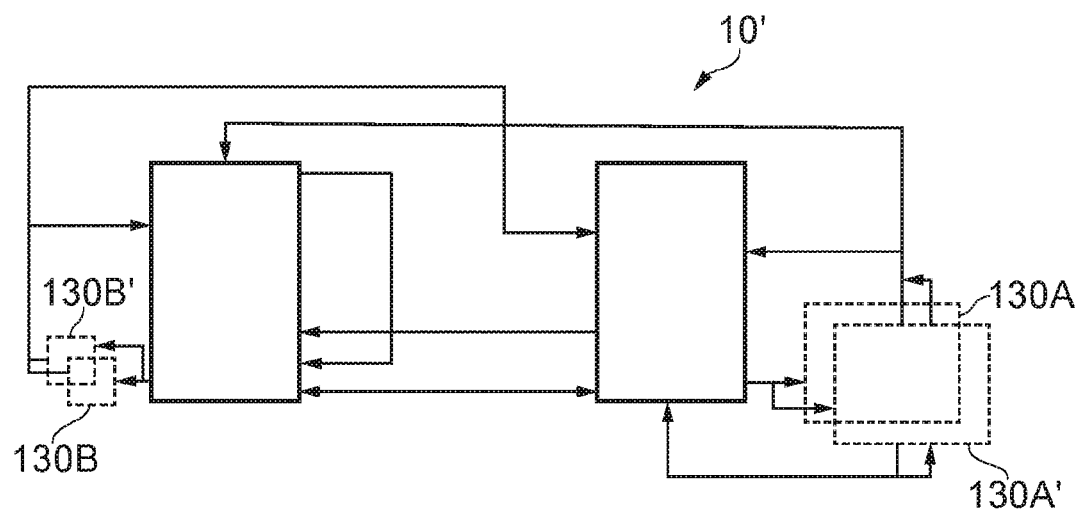
FIG. 2 shows an alternative abatement apparatus having differing cooling requirements.

FIG. 2 shows an alternative abatement apparatus 10'. The cooling requirements for this abatement apparatus 10' are higher than that of the abatement apparatus 10. In this case, the cooling requirements are no more than double that of the abatement apparatus 10, and so in this case two modular cooling assemblies 130A, 1308, 130A', 130B' are provided. It will be appreciated that if more cooling is required, then additional integer numbers of the modular cooling assemblies 130A, 130B can be provided to meet those cooling needs. For example, if the modular cooling assembly 130A, 130B is configured to provide X kW of cooling and the abatement apparatus 10' requires Y kW of cooling, then the integer number N of modular cooling assemblies can be determined from N=roundup (Y/X). They together feed their own quench assemblies, the sieve and the weirs. However, each of the modular cooling assemblies are identical, which reduces the inventory required to produce abatement apparatus with differing cooling needs.

Furthermore, in some embodiments, a single identical, matching and/or mirrored pump is used for each of the first pump 140, second pump 200, third pump 250 and fourth pump 260, again to reduce inventory count.

Combined Drain Chamber and Sump Chamber Module

Figure 3:
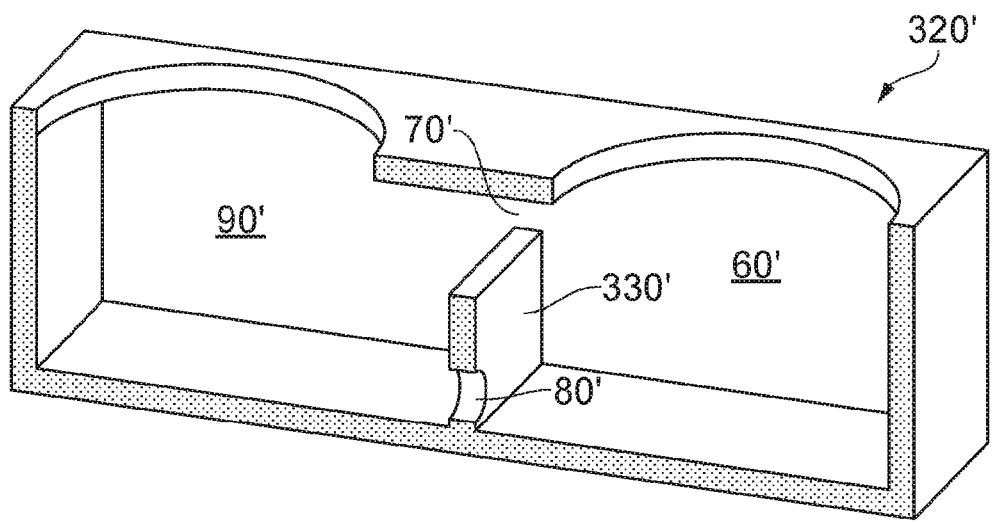
FIG. 3 is a sectional view illustrating a combined drain chamber and sump chamber module.

FIG. 3 is a sectional view illustrating a combined drain chamber and sump chamber module 320' according to one embodiment that can be incorporated in place of the drain chamber 60 and sump chamber 90 mentioned above. The combined drain chamber and sump chamber module 320' has a drain chamber 60' and an adjacent sump chamber 90', partially separated by a separating wall 330' which defines a coolant balance conduit 80' below the expected coolant level and a gas conduit 70' above the expected coolant level.

Some embodiments provide an arrangement where water circulation (pumping) filtration, cooling and delivery (via spray nozzles) is broken down into units of discrete matched capacity, for example 100 kW. For a range of modular abatement systems, multiples of these elements are added as required. The circulation rate is defined by the maximum temperature of the water in the drain tank, the available cooling water temperature and the specification of the heat exchanger. Excess water over that required for the quench sprays is deposited onto the sieve plate of the packed tower, from which excess overflows to a sump below the packed tower. This cooled water is circulated to various locations within the abatement system. Typically a centrifugal water pump is used to take warm, acid and particulate-laden water from a drain tank or sump and pressurise it, causing it to flow through a hydrocyclone (for removal of particulate matter) a heat exchanger (usually of the parallel plate type) and then back to the various locations within the abatement system. A range of modular burner abatement systems is proposed comprising 2n discrete burner modules housed within a rectangular plenum mounted on a rectangular weir. The new approach to cooling and water management in some embodiments is as follows: a centrifugal pump takes water from a drain tank at around 66 l/min and passes it to a hydrocyclone where an underflow of around 10% containing the bulk of the particulate material is returned back to the sump with the remaining 60 l/min passing to a parallel plate heat exchanger. With a 25° C. AT on the process side, this gives ~100 kW of cooling. The cooled water is presented to a block or pair of blocks forming manifolds containing spray nozzles, ideally flat fan type spray nozzles. These mount on opposite external faces of the rectangular weir, spraying through apertures cut into the walls and are advantageously arranged such that the sprays interleave across the void of the weir. Cooling blocks with their nozzles are also designed to give 100 kW increments of cooling. The pump circulates more water than is required for the spray nozzles; the excess is deposited on the sieve plate feeding the packed tower. This configuration is repeated 2, 3, 4, n times for systems designed with 200, 300, 400, n x100 kW heat capacities. The sieve plate also has a stand-pipe to define the height of water on the plate and thus the flow-rate of water down the tower. Excess water flows over the rim of the standpipe and down to the sump under the packed tower without passing through the packing. In one embodiment the aforementioned water pump is a two-stage pump with the stages in series and the hydrocyclone and heat exchanger plumbed between the stages. Note that the sump under the packed tower is not the same as the drain tank, as the former contains cooled, filtered water whereas the latter contains un-cooled particulate-laden water. A balance pipe may exist between the two to maintain constant level. A second pump takes water from the cold sump and lifts it to locations such as the weir, the water-walls of the wet electrostatic precipitator and the secondary cooling spray between the quench and the packed tower. The second pump may be the same two-stage pump used in the cooling modules, but with the stages in parallel. This modular approach minimises inventory and allows a wide range of products to be configured with minimal engineering overhead. It also provides a reduced spare parts burden. Variations may come in the specifications of the individual components, for example the modular increment may be for other cooling amounts, such as for example 50 kW or 80 kW.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A method of cooling an abatement apparatus for abatement of an effluent stream from a semiconductor processing tool, the method comprising:
    providing at least one modular cooling assembly having a cooling capacity;
    determining a cooling requirement of an abatement apparatus; and
    incorporating into said abatement apparatus a number of said modular cooling assemblies whose cumulative cooling capacity at least matches said cooling requirement of said abatement apparatus.

2. The method of claim 1, wherein said incorporating comprises incorporating said number of said modular cooling assemblies whose cumulative cooling capacity exceeds said cooling requirement of said abatement apparatus.

3. The method of claim 1, wherein said incorporating comprises incorporating a plurality of said modular cooling assemblies.

4. The method of claim 1, wherein said providing comprises providing each modular cooling assembly with at least one pump to recirculate coolant within said abatement apparatus to cool said abatement apparatus.

5. The method of claim 4, wherein each pump of said modular cooling assembly is identical.

6. The method of claim 1, wherein said providing comprises providing each modular cooling assembly with a separator to separate particulates within said coolant to provide a particulate stream and a coolant stream to cool said abatement apparatus.

7. The method of claim 6, wherein said providing comprises configuring said separator to convey said particulate stream to said drain tank.

8. The method of claim 1, wherein said providing comprises providing each modular cooling assembly with a heat exchanger to cool incoming coolant and provide outgoing coolant to cool said abatement apparatus.

9. The method of claim 8, wherein said providing comprises configuring said first pump, said separator and said heat exchanger in series to provide said outgoing coolant to cool said abatement apparatus.

10. The method of claim 8, wherein said providing comprises providing each modular cooling assembly with a second pump located downstream of said first pump, said separator and said heat exchanger to provide said outgoing coolant to cool said abatement apparatus.

11. The method of claim 1, wherein said providing comprises providing each modular cooling assembly with a first pump configured to convey said coolant from a drain tank downstream of an abatement chamber within a first tower of said abatement apparatus to cool said abatement apparatus.

12. The method of claim 11, wherein said providing comprises providing each modular cooling assembly with a quench sprayer located downstream of said abatement chamber and conveying said outgoing coolant to said quench sprayer to cool said first tower of said abatement apparatus.

13. The method of claim 11, wherein said providing comprises configuring said further pump assembly to convey said coolant to a first weir of said first tower to cool said abatement apparatus.

14. The method of claim 1, wherein said providing comprises providing each modular cooling assembly with a sieve feed conduit located upstream of a sieve within a second tower of said abatement apparatus and conveying said outgoing coolant to said sieve feed conduit to cool said second tower of said abatement apparatus.

15. The method of claim 14, wherein said providing comprises conveying said outgoing coolant in a greater quantity to said quench sprayer than to said sieve feed conduit.

16. The method of claim 14, comprising providing said sieve with an overflow configured to convey excess head of coolant from said sieve to said sump tank.

17. The method of claim 14, wherein said providing comprises conveying said coolant in a greater quantity to said second tower than said first tower to provide a net flow of coolant through said coolant balance conduit from said second tower to said first tower.

18. The method of claim 14, wherein said providing comprises configuring said further pump assembly to convey said coolant to a second weir of said second tower to cool said abatement apparatus.

19. The method of claim 18, wherein said providing comprises conveying said coolant in a greater quantity to said second weir than to said first weir.

20. The method of claim 14, wherein said providing comprises providing each modular cooling assembly with a further pump assembly configured to receive said coolant from a sump tank within said second tower of said abatement apparatus to cool said abatement apparatus.

21. The method of claim 20, wherein said further pump assembly comprises third and fourth pumps arranged in parallel.

22. The method of claim 20, comprising providing said abatement apparatus with an effluent stream conduit fluidly coupling an above-coolant region of said drain tank with an above-coolant region of said sump tank.

23. The method of claim 20, comprising providing said abatement apparatus with a coolant balance conduit fluidly coupling a coolant region of said drain tank with a coolant region of said sump tank.

24. An abatement apparatus for abatement of an effluent stream from a semiconductor processing tool, the abatement apparatus having a cooling requirement and comprising:
 a number of modular cooling assemblies whose cumulative cooling capacity at least matches said cooling requirement of said abatement apparatus.

* * * * *